(12) United States Patent
Kazmaier et al.

(10) Patent No.: US 7,710,389 B2
(45) Date of Patent: May 4, 2010

(54) MULTI-LAYER DISPLAY DEVICE USING DOT FIELD APPLICATORS

(75) Inventors: Peter M. Kazmaier, Mississauga (CA); Hadi K. Mahabadi, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 917 days.

(21) Appl. No.: 11/266,389

(22) Filed: Nov. 4, 2005

(65) Prior Publication Data
US 2007/0103428 A1    May 10, 2007

(51) Int. Cl.
    *G09G 3/34*    (2006.01)
(52) U.S. Cl. ........................... 345/107; 345/88
(58) Field of Classification Search ............. 345/107, 345/84, 88; 359/296; 430/32, 37, 38; 427/14; 204/600; 264/4
    See application file for complete search history.

(56) References Cited

U.S. PATENT DOCUMENTS

| | | | |
|---|---|---|---|
| 4,272,596 A | | 6/1981 | Harbour et al. |
| 4,443,339 A | * | 4/1984 | Rosevear .................... 210/635 |
| 6,017,584 A | * | 1/2000 | Albert et al. ............. 427/213.3 |
| 6,225,971 B1 | * | 5/2001 | Gordon et al. ............. 345/107 |
| 6,297,652 B1 | * | 10/2001 | Shimoda et al. ............ 324/754 |
| 6,529,313 B1 | * | 3/2003 | Lin et al. .................... 359/296 |
| 6,680,726 B2 | * | 1/2004 | Gordon et al. ............. 345/107 |
| 6,727,873 B2 | * | 4/2004 | Gordon et al. ................ 345/88 |
| 6,873,451 B2 | * | 3/2005 | Ukigaya .................... 359/296 |
| 2003/0174385 A1 | * | 9/2003 | Liang et al. ................. 359/296 |
| 2003/0222842 A1 | * | 12/2003 | Yuasa .......................... 345/107 |
| 2003/0224102 A1 | * | 12/2003 | Minami ........................ 427/58 |
| 2004/0134854 A1 | * | 7/2004 | Higuchi et al. ............. 210/634 |
| 2005/0012979 A1 | * | 1/2005 | Minami ..................... 359/296 |

\* cited by examiner

*Primary Examiner*—Chanh Nguyen
*Assistant Examiner*—Kwang-Su Yang
(74) *Attorney, Agent, or Firm*—Oliff & Berridge PLC (57) ABSTRACT

A display device includes at least one cell containing a fluid having colored particles dispersed in the fluid and at least one dot field applicator associated with the cell. The dot field applicator may be a dot electrode.

22 Claims, 3 Drawing Sheets

MULTI-LAYER DISPLAY DEVICE USING DOT FIELD APPLICATORS

BACKGROUND

This disclosure relates generally to display devices, for example electrophoretic displays. In particular, this disclosure is directed to display devices including cells having dot field applicators associated therewith. Image formation and display can be achieved using the cells having dot field applicators associated therewith.

The display devices herein possess many advantages, including for example reduction of electrode light losses and better image quality over time. The displays herein may be used for any display application, including, for example, reimageable paper, electronic books, electronic signage, watch, monitor and/or cell phone displays and the like.

REFERENCES

Numerous types of electrophoretic displays have been proposed to create displays, most operating through migration of charged pigment particles suspended in a fluid in order to display an image.

One example of an electrophoretic display may include two electrode plates spaced apart and opposing each other. A suspending or carrier fluid containing dispersed and charged pigment particles is enclosed between the two electrode plates. At least one set of particles is typically included in the fluid.

Another example of an electrophoretic display involves the use of an electrophoretic ink included within cells or microcapsules, the ink containing two sets of differently colored and oppositely charged particles, for example black and white pigment particles. The particles are suspended in the liquid of the ink and can be electrically maneuvered to either the top or the bottom of the microcapsule or cell by application of an electric field placed across the cell. The electric field may be provided by at least one pair of electrode plates situated oppositely adjacent to either the top or the bottom of the cell. Application of the electric field maneuvers the black and white particles to opposite sides of the cell or microcapsule, thereby creating either a black color visible to the viewer or a white color visible to the viewer.

Thus, when the top electrode plate is charged with a polarity opposite to the charge of one set of the pigment particles, that set of pigment particles migrates to the top electrode plate, and thus a viewer observes the color of that set of pigment particles at that portion of the display. At the same time, the other set of particles is attracted to the opposite, back electrode so as not to be visible at that location of the display. Reversing the polarity of the field applied by the electrode plates results in both of the sets of particles moving to the opposite electrode plates in the display, and thus the color of the second set of particles then being displayed. During the switch in color, the particles of the two sets of particles must move past each other within the cell or microcapsule.

A potential shortcoming of such an electrophoretic display is that the black pigment particles and the white pigment particles must move past each other in opposite directions to the opposite electrode plates as discussed above. This movement creates particle turbulence, which in turn may lead to particle mixing/charge switching as the particles are bounced into each other, resulting in the black pigment particles being swept to the electrode plate that carries the same charge as black pigment particles and the white pigment particles being pushed and trapped to the opposite electrode plate that carries the same charge as the white pigment particles. Stated another way, a black state may not be completely comprised of black pigment particles and a white state may not be completely comprised of white pigment particles at the viewing region. Over time, the image quality of the device can thus become increasingly degraded.

U.S. Pat. No. 4,272,596 describes an electrophoretic display which comprises a pair of electrodes spaced apart to form a cavity therebetween. The cavity includes an electrophoretic suspension layer comprising a suspending medium containing a set of colloidal particles suspended in an electrically insulating liquid. A voltage is applied to the pair of electrodes to cause the particles to form an image configuration.

U.S. Pat. No. 6,529,313 describes an electrophoretic display which comprises a multiplicity of reservoirs each containing at least two sets of particles with contrasting colors and carrying opposite charges suspended in a transparent and/or colored electrophoretic display fluid.

SUMMARY

Described herein are display devices including cells having dot field applicators, which design substantially avoids such potential shortcomings as illustrated herein. The disclosed design permits electrode light losses to be substantially reduced through use of dot field applicators. Moreover, a thinner display may be achieved when dot field applicators are employed. Particle turbulence may also be substantially reduced or eliminated through the use of dot field applicators.

One embodiment of the present disclosure relates to a display device including at least one cell containing a fluid having colored particles dispersed in the fluid, and at least one dot field applicator associated with the at least one cell.

Another aspect of the present disclosure relates to a display device that includes at least a first display layer and a second display layer over the first display layer, wherein each display layer comprises at least one cell containing a fluid and a set of colored particles dispersed in the fluid. At least one dot field applicator is associated with the at least one cell in each display layer, and the colored particles in each display layer exhibit a different color.

Yet another aspect of the present disclosure relates to a method for displaying an image in a display device including at least one cell containing a fluid having colored particles dispersed in the fluid, and at least one dot field applicator associated the at least one cell. The method includes applying a field to the colored particles by the dot field applicator associated with such cell to effect a state in which the color of the colored particles in the cell is not displayed and not applying the field to the colored particles by the dot field applicator associated with the cell to effect a state in which the color of the colored particles in the cell is displayed.

EMBODIMENTS

Many color switching devices occur in nature. Cephalopods such as octopuses and squids have an ability to switch color very rapidly in order to blend into the environment. They accomplish the color switching by having cells called chromatophores. Chromatophores are cells that consist of pigment granules and are surrounded by 15 to 25 radial muscles. Cephalopods have a number of chromatophores with different color pigments. In order for a cephalopod to display a color, for example a reddish brown color, the radial muscles expand the reddish chromatophores while contracting adjacent chromatophores containing other color pigments until the adjacent chromatophores are reduced to a minimum size. An observer will see a uniform reddish brown color on the skin of the cephalopod because the adjacent chromatophores have been squeezed to a minimum size and are no longer visible to the observer.

The mechanism of the cephalopod coloration, namely, switching from one color state to another color state, may be approximated herein by display designs as described in embodiments herein.

Electrophoretic in embodiments herein refers to, for example, being capable of movement through a solution through application of an electric field. Although embodiments herein are described as electrophoretic using dot electrodes as the dot field applicators to apply an electric field, it should be noted that any external field that can cause the particles to move within the device may be used in place of, or in conjunction with, an electric field. For example, acoustic fields, dielectric fields through application of electric field gradients, a rapidly varying alternating current pulse, or magnetic fields if ferro pigmented particles are used, may be equally used herein.

An embodiment of a display device includes at least one cell containing a fluid having colored particles dispersed in the fluid and at least one dot field applicator, such as a dot electrode, located above or below the cell. The display device design may involve switching between a state in which the color of the colored particles in a cell or cells of a display layer are visible to a viewer and a state in which the color of the colored particles in a cell or cells of the display layer are not visible to the viewer, using the dot field applicators associated with the display. By way of an example, when charged black colored particles are dispersed throughout a cell of the display device, a viewer observes the display to have a black color at this cell. When a field, for example an electric field, is applied by the dot field applicators, the black color particles are attracted to the dot field applicators, and the viewer observes no black color at the cell, as will be detailed below.

One embodiment of a display device includes at least a display section and a dot field applicator section. The display section includes a display layer comprised of at least one cell or unit. A cell in embodiments refers to, for example, an individual unit of the display layer that contains a fluid and a set of colored particles, and may have at least one dot field applicator associated therewith. The cell may be defined by walls and/or as a microcapsule. The length and the width of a cell may be in the range of for example, from about 1 μm to about 10 mm, more specifically from about 1 μm to about 1 mm or from about 30 μm to about 10 mm. In embodiments, one cell corresponds to one pixel of the display.

Each cell thus includes at least a fluid and a set of colored particles. As the fluid, any transparent or clear, or colored fluid may be used. The fluid may be comprised of any suitable liquid known in the art for display fluids. The choice of fluid may be based on chemical inertness, density matching to the set of colored particles and/or chemical compatibility to the set of colored particles. The viscosity of the fluid may be relatively low, such as from about 0.1 cp to about 10 cp, more specifically from about 0.1 cp to about 7 cp or from about 0.5 cp to about 5 cp, to allow the particles to be able to move through the fluid at the intended temperature of operation, which may typically be room temperature (from about 20° C. to about 26° C.), and disperse throughout the cell. In addition, the fluid may be dielectric and substantially free of ions.

Suitable fluids include, for example, organic solvents, such as halogenated organic solvents, saturated linear or branched hydrocarbons, silicone oils, and low molecular weight halogen-containing polymers. Suitable organic solvents include, for example, epoxides, such as decane epoxide and dodecane epoxide; vinyl ethers, such as cyclohexyl vinyl ether; and aromatic hydrocarbons, such as, for example, toluene and naphthalene. Suitable halogenated organic solvents include, for example, tetrafluorodibromoethylene, tetrachloroethylene, trifluorochloroethylene, 1,2,4-trichlorobenzene, and carbon tetrachloride. Suitable hydrocarbons include, for example, decane, dodecane, tetradecane, xylene, toluene, hexane, cyclohexane, benzene, the aliphatic hydrocarbons in the ISOPAR® series (Exxon), NORPAR® (a series of normal paraffinic liquids from Exxon), SHELL-SOL® (Shell), and SOL-TROL® (Shell), naphtha, and other petroleum solvents. Suitable examples of silicone oils include, for example, octamethyl cyclosiloxane and higher molecular weight cyclic siloxanes, poly(methyl phenyl siloxane), hexamethyldisiloxane and polydimethylsiloxane. Useful low molecular weight halogen-containing polymers include poly(chlorotrifluoroethylene) polymer or KRYTOX® from Dupont.

Colored particles may be pigments, dyed particles, pigment/polymer composites, combinations thereof and the like. These particles may be either positively charged or negatively charged. The term "color" may encompass a number of aspects such as hue, lightness and saturation, where one color may be different from another color if the two colors differ in at least one of these aspects. For example, two colors having the same hue and saturation but different in lightness would be consider different colors. Any suitable colors such as, for example, red, white, black, gray, yellow, cyan, magenta, blue and purple, can be used to produce a color.

Colored particles may include particles that are individually not visible to the naked eye of a human being. A colored particle may be individually non-visible to a human being when the diameter of the colored particle is in a range of, for example, from about 0.2 μm to about 50 μm, such as from about 5 μm to about 15 μm or from about 10 μm to about 50 μm. In contrast, the size of a cell may be relatively large, for example in a range of from about 1 μm to about 10 mm, such as from about 1 μm to about 1 mm or from about 30 μm to about 1 mm. In every case, the cell dimensions are substantially larger than the individual particle dimensions. Thus, the size of the colored particles allows them to be situated in the cell and dispersed in the fluid.

In addition, the colored particles may have properties that allow them to be dispersed in the fluid. These properties include, for example, density of the colored particles, size of the colored particles, mobility of the colored particles, surface area of the colored particles and charge density of the colored particles.

In embodiments, the colored particles may be prepared by conventional physical processes such as grinding of pigments or chemical processes such as emulsion/aggregation techniques. Emulsion/aggregation processes for making colored particles are well known. Example processes are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, 5,346,797 and 6,529,313.

As examples of suitable colorants for use in making the colored particles, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye-identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF).

Any suitable proportion of colored particles to fluid may be used. The amount of colored particles in the fluid, expressed in a weight % of the fluid and colored particles, may be in the range of from about 5% to about 85% by weight of the fluid and colored particles, for example from about 5% to about 50% by weight or from about 25% to about 50% by weight.

For suitable suspension and dispersion of the colored particles throughout a cell, the fluid and the colored particles may have a substantially matched density. Density is defined as mass per unit volume. Density can be expressed in grams per cubic centimeters for solids and liquids. Substantially matched density refers, in embodiments, to for example the density of the fluid and the density of the colored particles being within substantially the same range. For example, the density of the particles may range from about 0.85 g/cm$^3$ to about 4.5 g/cm$^3$, such as for example from about 0.85 g/cm$^3$ to about 1.5 g/cm$^3$ or from about 1.3 g/cm$^3$ to about 3.5 g/cm$^3$, and the fluid density may range from about 0.8 g/cm$^3$ to about 2 g/cm$^3$, such as from about 0.8 g/cm$^3$ to about 1.2 g/cm$^3$ or from about 1.1 g/cm$^3$ to about 2 g/cm$^3$.

As a further example, a cell may contain a trifluorochloroethylene fluid having a density from about 1.456 g/cm$^3$ to about 1.462 g/cm$^3$. In order to have a substantially matched density with the fluid, the density of the colored particles may be in the range of from about 1.4 g/cm$^3$ to about 1.5 g/cm$^3$, such as from about 1.425 g/cm$^3$ to about 1.48 g/cm$^3$ or from about 1.435 g/cm$^3$ to about 1.465 g/cm$^3$. Both of these materials have high densities. High density refers, for example, to the density of a material being greater than about 1.2 g/cm$^3$, such as about 1.5 g/cm$^3$ or more. Low density refers, for example, to the density of a material being less than about 1 g/cm$^3$, such as about 0.9 g/cm$^3$ or less.

If the densities of the fluid and the colored particles are not substantially matched, for example the colored particles have a density of about 2.5 g/cm$^3$ and the fluid has a density of about 0.86 g/cm$^3$, the colored particles may not be able to stay afloat in the fluid on their own and may tend to settle to the bottom of the fluid. When the colored particles are settled to the bottom of the fluid, the particles may no longer be dispersed throughout the cell. As a result, the color quality of the colored particles as viewed by a viewer may be degraded and/or non-uniform.

Another way to achieve suitable suspension and dispersion of the colored particles throughout a cell, and to offset the above effects when the colored particles and fluid may not have a substantially matched density, is to apply an AC voltage to the cell to assist in the dispersion of the colored particles in the fluid. The application of a rapidly varying AC voltage may cause the colored particles to vibrate and to migrate within the cell. The vibration of the colored particles allows the colored particles to migrate more freely within the confinement of the cell, and may enable the colored particles to disperse more quickly throughout the cell. Thus, the application of the AC voltage may force the colored particles to disperse more equally within the cell to achieve a uniform dispersion to achieve a state in which color of colored particles in a cell or cells of a display layer are visible to a viewer.

In addition, the field strength of the dot field applicators may not be enough to attract all colored particles within the cell to move toward the dot field applicators. Thus, an additional field may be applied to assist in particle movement within the cell. For example, in an electrophoretic cell, a rapidly varying AC voltage may be used to assist the colored particles to move toward the dot field applicators. With or after the application of an electric field by the dot electrodes, for example a DC voltage, an AC voltage may be applied to the cell to set the colored particles to vibrate. The vibration of the colored particles allows the colored particles to migrate more freely within the confinement of the cell and may enable the colored particles to move more quickly toward the dot electrodes. Thus, the application of the AC voltage to the cells simultaneously with and/or subsequent to the application of the DC voltage to the cell may result in the colored particles more quickly stacking on one another on the dot field applicators to achieve a state in which the color of colored particles in a cell or cells of a display layer are substantially not visible to a viewer.

A display device also includes a dot field applicator section. Dot field applicators may be, for example, electrodes, magnets or any other device that can apply a field to manipulate movement and arrangement of colored particles in the display fluid. A dot field applicator refers to, for example, a device for applying a field such as illustrated herein and having a size less than a size of the cell with which it is associated. Less, in embodiments, refers to a unit of measurement for one object being smaller than the unit of measurement for another object. Size herein refers to, for example, the length and/or width, or diameter, of the dot field applicator and/or the length and/or width, or diameter, of the cell. Dot field applicators may have a size (length, width and/or diameter) in the range from about 0.1 µm to about 50 µm, for example, from about 0.1 µm to about 0.5 µm or from about 5 µm to about 50 µm. The dot field applicators thus may be referred to as microdots. In embodiments, dot electrodes may be employed as the dot field applicators.

In embodiments, at least one dot field applicator may be associated with a cell. Alternatively, more than one dot field applicator may be associated with a cell. Two or more dot field applicator, for example about 2 to about 500 dot field applicators, such as about 2 to about 100 or about 4 to about 200, may be associated with the cell. Three or more dot field applicators may also be used, for example about 3 to about 500, such as about 3 to about 100, dot field applicators, may be associated with the cell.

Where more than one dot field applicator is associated with a cell, the distance from one dot field applicator to another dot field applicator associated with the same cell may be in the range from about 0.5 µm to about 8 mm, more specifically from about 0.5 µm to about 1 mm or from about 0.8 µm to about 1 mm.

The location of the dot field applicator with respect to the cell may vary. That is, the dot field applicator may be associated with the cell in any manner, for example such as located anywhere near the cell or in contact with the cell, for example the dot field applicator may be located above or below the cell. The dot field applicator can also be placed inside or outside substrates of the cell.

The dot field applicators may be arranged in a pattern. A pattern of dot field applicators refers, for example, to any repeating organization of the dot field applicators associated with the cell. In embodiments, the pattern may such that adjacent dot field applicators associated with the cell are each substantially equally spaced from one another, for example so that the distance from each adjacent dot field applicator is within at least about 0.01 µm to about 0.5 mm.

In a display device, one dot field applicator can cause a cell to switch between a state in which color of colored particles in a cell or cells of a display layer are visible to a viewer and a state in which color of colored particles in a cell or cells of the display layer are not visible to the viewer using dot field applicators associated with the display.

In order to maneuver and manipulate the colored particles in a cell, a field, such as an electric or magnetic field, may be provided by the dot field applicators to the cell with which it is associated. The field may then manipulate the colored particles by forcing the colored particles to move in a certain direction.

The interaction between the dot field applicators and the colored particles forms the basis for operation of the display device in displaying an image. An embodiment for displaying an image in a display device includes at least one cell containing a fluid having colored particles dispersed in the fluid and at least one dot field applicator such as a dot electrode located above or below the cell. A state in which the color of colored particles in a cell or cells of a display layer are not visible to a viewer may be achieved by applying a field such as an electric field by the dot field applicator and attracting the colored particles in a stacked manner to the dot field applicator. The average diameter of colored particles may be in the range of from about 0.2 µm to about 50 µm, for example from about 0.2 µm to about 15 µm or from 10 µm to about 50 µm, which is substantially invisible to a viewer. Thus, when the colored particles are stacked in a column over the dot field applicator, the viewer sees substantially no color of the colored particles as the stacked column of colored particles may have a width corresponding substantially to the average diameter of the colored particles. Instead, the viewer sees the color of the fluid which may be clear, transparent or colorless and/or the color of the background of the display device such as a back substrate.

A state in which the color of colored particles in a cell or cells of a display layer are visible to a viewer may be achieved by not applying the field such as an electric field to the colored particles by the dot field applicator associated with the cell. The colored particles are free to disperse throughout the fluid of the cell. As such, a viewer sees the color of colored particles in the dispersed state. An individual colored particle is invisible to a viewer because a colored particle may have an average diameter of from about 0.2 µm to about 50 µm, for example, from about 0.2 µm to about 15 µm or from 10 µm to about 50 µm. However, when tens to thousands of colored particles are dispersed within the cell, the viewer sees the color of the colored particles because the accumulation of the colored particles makes the color of colored particles visible to the viewer.

Thus, a display device may be designed such that when the field of the cell is applied to the colored particles by the dot field applicators, particles therein are attracted to the dot field applicators and thereby a state in which no color of colored particles in a cell or cells of a display layer are visible to a viewer may be achieved. Furthermore, when the field is not applied to the colored particles by the dot field applicators, the colored particles disperse throughout the cell, and a state in which the color of colored particles in a cell or cells of a display layer are visible to a viewer may be achieved. Through appropriate control of the dot field applicators among the cells across a display layer, the display layer may have some cells showing the color of the colored particles and some cells not showing the color of the colored particles, thereby generating an image. So long as the field is applied by the dot field applicators, an image may remain visible to the viewer.

For example, in an electrophoretic display wherein an electric field is applied, the creation of an electric field may be achieved by applying a voltage to the dot electrodes. When the voltage, such as a DC voltage, is applied to the dot electrodes, the dot electrodes associated with the cell then apply an electric field at a given polarity to the colored particles. If the polarity is opposite to the charge of the colored particles, the colored particles will be attracted to the dot electrodes so as to move to the dot electrodes and stack one over another therein. When a reverse polarity is applied to the dot electrodes, the colored particles repel from the dot electrodes and move away from the dot electrodes.

By way of an example, an electrophoretic cell contains a transparent fluid and black particles carrying a negative charge. A dot electrode is located below the cell. Initially, the black particles may be dispersed throughout the cell. The black particles may have an average diameter of from about 0.2 μm to about 50 μm, for example, from about 0.2 μm to about 15 μm or from 10 μm to about 50 μm, which is invisible to naked eyes of a viewer. The viewer sees a black color when tens to thousands of black particles are dispersed within the cell. A DC voltage may then be applied to the dot electrode, generating for example a field with a positive polarity. Because opposite charges attract to one another, the black particles carrying the negative charge may be attracted to the dot electrode and stack over one another. As a result, the black particles may be concentrated to the location of the cell where the dot electrode is situated. Because substantially no black particles will be located anywhere else in the cell once stacked, the viewer sees only the fluid. The viewer may not see the black particles because naked eyes cannot view the stacked column of black particles with a width corresponding substantially to the average diameter of the colored particles. Thus, switching between a state in which color of colored particles in a cell or cells of a display layer are visible to a viewer and a state in which color of colored particles in a cell or cells of the display layer are not visible to the viewer using dot electrodes associated with the display may thus be achieved.

In embodiments herein, a display layer may include multiple cells arranged adjacent to one another. Cells may be segregated by using, for example, spacers therebetween or by forming individual cells, for example as microcapsules.

Thus, in embodiments, spacers keep individual cells separated from each other. Any suitable spacer design may be used. A spacer layer may be a screen spacer in which holes within the screen define the individual cells, a laser punched spacer layer comprised of a sheet having holes laser punched therein in which the laser punched holes define the individual cells, a pocket spacer layer comprised of two sheets joined together and containing a pattern of pockets within and between the two sheets in which the pockets define the individual cells, an etched photoresist layer formed upon one of the conductive film substrates in which holes etched in the photoresist layer define the individual cells, composite etched layer comprised of a composite of two photoresist layers sandwiching a conductive film in which holes etched in the composite define the individual cells and the like. The thickness of a spacer layer may be in the range from about 10 microns to about 300 microns, for example, from about 10 microns to about 50 microns or from about 50 microns to about 300 microns.

Microcapsules may be prepared by any suitable method of encapsulation. The process of encapsulation may include conventional coacervation, interfacial polymerization, in-situ polymerization, electrolytic dispersion and cooling, or spray-drying processes. The microcapsules may also be prepared by a process utilizing isocyanate-polyol, urea-formaldehyde-resorcinol, melamine-formaldehyde resins, or hydroxypropyl cellulose wall-forming materials.

The display device may also include at least two substrates. One substrate may be located above the cell (top substrate) and a second substrate (back substrate) may be located below the cell. The two substrates may be clear or transparent, which in embodiments refers to the layer having low optical absorption so that objects may be easily seen on the other side thereof. The two substrates may also be arranged so that the top substrate is clear or transparent and the back substrate is colored. The two substrates may define the display device by having a cell or cells situated between the two substrates. Thus, the display section may comprise two substrates, one on top and one on bottom with a display cell or cells situated therebetween.

The substrates may sandwich a spacer layer therebetween and have a length and width corresponding to the overall length and width of the display device. Suitable substrates may be continuous, unitary films that are not separated over just individual cells of the display device. Suitable substrates may be prepared to be as thin as possible while still maintaining appropriate structural integrity. For example, the substrates may have a height (thickness) of from about 20 microns to about 100 microns, for example from about 20 microns to about 60 microns or from about 40 to about 100 microns.

Any materials known and used in the art may be selected for substrates of a display device. The substrate may be non-conductive, for example a polymer film such as polyester like polyethylene terephthalate and the like, glass, and the like. Additional suitable materials out of which a non-conductive substrate can be formed include polycarbonates such as MAKROLON, available from Bayer Chemical Co., and MERLON, available from Mobay Chemical Co., LEXAN, available from General Electric Co., polysulfones such as P-3500, available from Union Carbide Corp., polyesters such as PE-100 and PE-200, available from Goodyear Tire and Rubber Co., cellulosic resins, polyarylates, alkyds, acrylics, styrene-butadiene copolymers, polyarylsulfones, polybutylenes, polyether sulfones, polyphenylenesulfides, polyurethanes, polyamides, polyimides such as KAPTON, available for E.I. du Pont de Nemours & Co., epoxies, poly(amide-imides) such as A1830, available from Amoco Chemical Corp., polyethersulfones, polyetherimide such as ULTEM available from General Electric Co., polyvinylidine fluoride such as KYNAR available from Pennwalt Corp. and TEDLAR available from E.I. du Pont de Nemours & Co., polyarylethers, and the like, and mixtures thereof.

In embodiments, the substrate material may be conductive, and thus may be in the form of an electrode plate. For example, conductive plastic films like plastic films coated with indium tin oxide (ITO) such as polyethylene terephthalate (PET) films, conductive glass films, such as ITO coated glass, and conductive thin metals, may be used. For transparency, ITO coated plastic and glass films may be used. Suitable electrically conductive materials may also include, for example, metal flakes, powders or fibers of materials such as metal oxides, sulfides, silicides, quaternary ammonium salt compositions, conductive polymers such as polyacetylenes or their pyrolysis and molecular doped products, charge transfer complexes, polyphenylsilane and the like.

With the dot field applicators being placed at either above or below a cell, the top substrate or electrode may be clear and/or transparent. As a result, reflected light losses due to the absorption of light by the conductive layer may be significantly reduced.

A multiple color display is also possible with the use of multiple display layers and dot field applicators associated with each display layer. Multiple display layers can be stacked one over another, for example a first display layer may be situated adjacent to the back substrate of a display device, and the second display layer may then be situated over the first display layer. Over, in embodiments, refers to being in or at a position above or higher than another object: A layer over another layer may or may not be in contact, and additional layers or materials may or may not be therebetween. Additional display layers, for example third, fourth and the like, may be situated over the second display layer, as desired or required.

Each display layer may have a different color relative to the other display layers. The different colors exhibited by each display layer may be achieved by having a different set of colored particles dispersed in each display layer. By way of an example, a display device may have two display layers stacked one over another. Each display layer may be filled with different colored particles in a clear or transparent fluid. For example, the second display layer over the first display layer may have dispersed red colored particles that carry a negative charge and the lower first display layer may have dispersed blue colored particles that also carry a negative charge. Dot field applicators can be either located above or below each display layer. Dot field applicators in the first display layer may be offset from dot field applicators in the second display layer situated over the first display layer so as to potentially minimize interaction between the dot field applicators of different layers. Offset refers to, for example, the dot field applicators in respective layers not being aligned vertically. With this arrangement, the field provided by the dot field applicators in the first display layer does not substantially affect the movement of the colored particles in the second display layer, and vice versa.

An image may be displayed in a number of ways when at least two display layers are involved. For example, as detailed below with respect to multiple layer electrophoretic displays, a first color display operation is when no DC voltage is applied to the dot field applicators of either the first display layer or the second display layer, no field is generated to attract the either red colored particles or the blue colored particles in the cells of the display layers, thus a viewer sees either a red color (as the color of the layer closest to the viewer) or a mixture of red and blue colors (the colors from both layers combined). The viewer may observe a red color if the density of red colored particles in the fluid of the second display layer is high, for example making up from about 30% or more, such as from about 30% to about 50% or from about 35% to about 50%, of the fluid and colored particles. Alternatively, the viewer may observe a mixture of red and blue colors, resulting substantially in a visible mixed color such as purple, if the density of red colored particles in the fluid of the first display layer is lower, for example, where the red colored particles in the second display layer comprise from about 5% to about 30%, such as from about 5% to about 25%, of the fluid and colored particles.

Second, when a DC voltage is applied to the dot field applicators of the second display layer and no DC voltage is applied to the dot field applicators of the first display layer, a field such as an electric field is generated by the dot field applicators of the second display layer and no field is generated by the dot field applicators of the first display layer. The red colored particles that carry a negative charge are then attracted to the dot field applicators located above or below the cells of the second display layer, and stacked one over another at the location(s) of the dot field applicator. The stacking of the red colored particles results in the cells of the second display layer having substantially no red color as viewed by a viewer. The viewer thus can see through the second display layer cells to observe the blue color of the first display layer as the blue colored particles are dispersed in the layer.

Third, when a DC voltage is applied to the dot field applicators of the first display layer and no DC voltage is applied to the dot field applicators of the second display layer, a field such as an electric field is generated by the dot field applicators of the first display layer and no field is generated by the dot field applicators of the second display layer. The blue colored particles that carry a negative charge are then attracted to the dot field applicators located above or below the cells of the first display layer and stacked one over another. The stacking of the blue colored particles results in the cells of the first display layer having substantially no blue color as viewed by a viewer. The viewer thus observes only the red color as the red colored particles are dispersed in the second display layer;

Fourth, when a DC voltage is applied to both the dot field applicators of the first display layer and the dot field applicators of the second display layer, a field such as an electric field is generated by the dot field applicators of both display layers. Both the red and blue colored particles that carry a negative charge are then attracted to the dot field applicators located above or below the cells of the display layers and stacked one over another in the corresponding display layers. The stacking of both the red and blue colored particles at the locations of the dot field applicators results in the cells having substantially no red or blue color as viewed by a viewer. The viewer thus observes only the color of the background of the display device, such as the color of a back substrate or electrode.

In addition, in two particle electrophoretic displays, a polarity switch causes particles to move from one electrode plate to another electrode plate so that a significant space is needed to allow such movement by the particles. In display devices having dot field applicators, however, the particles move away from the dot field applicators when a field switch occurs instead of up-down movement, and thus less space may be required in display devices having dot field applicators, resulting in displays having much thinner layers and better viewing angle dependence.

Furthermore, particle turbulence may be eliminated by the presence of dot field applicators. Using the polarity of dot field applicators to move the particles from a concentrated state to a dispersed state avoids particle mixing and color degradation. In the conventional two-particle display devices, when an electric field is applied to the two electrodes with opposite polarities, two sets of different colored particles which also have opposite charges move past one another and attract to either the positive or the negative electrodes. During the process of moving to the electrodes, the two sets of different colored particles collide with one another, leading to turbulence and particles having with a positive charge sweep to the positive electrode. Charge transfer may also occur between the particles during the process. Single color image display becomes impossible as particles having one color mix with particles having another color and both sets of colored particles move to the viewing area. Over time, image quality of the two-particle display devices become increasingly degraded. Display devices using dot field applicators, on the other hand, does not have particle mixing problems because only one set of colored particles is used instead of two sets of colored particles for the two-particle display devices. The movement of the particles is controlled by dot field applicators. The particles are only moving either in a direction to disperse or a direction to stack over one another. As a result, color mixing may be eliminated with display devices using dot field applicators.

The embodiments, will now be further described with references to FIGS. 1 through 4.

Figure 1:
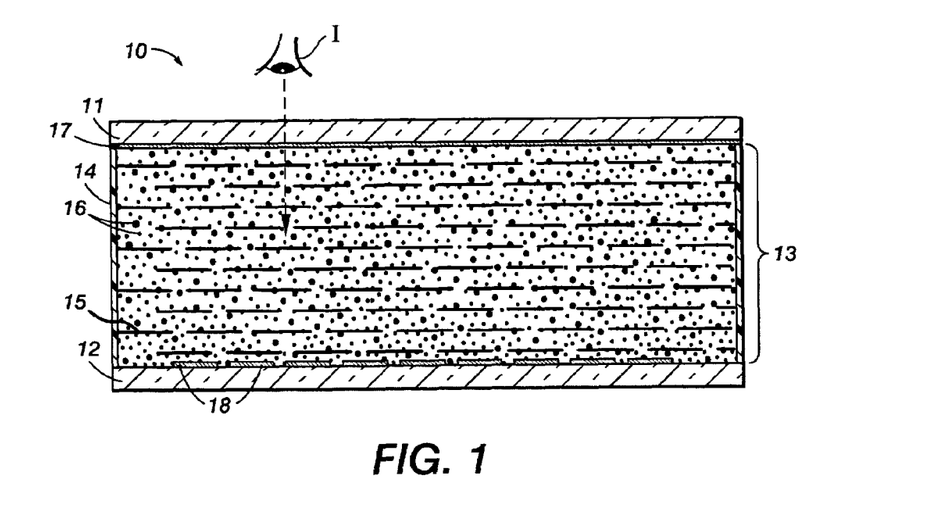
FIG. 1 shows a schematic cross section view of an embodiment of a display device wherein the colored particles are dispersed throughout a cell of the display device to display the color of the colored particles in the cell.

FIG. 1 schematically depicts an embodiment of an electrophoretic display device 10. The display device 10 can be in two states, a state in which color of colored particles in a cell or cells of a display layer are visible to a viewer as depicted in FIG. 1 or a state in which color of colored particles in a cell or cells of the display layer are not visible to the viewer, as a result of using dot electrodes associated with the display as depicted in FIG. 2 and FIG. 3.

As shown in FIG. 1, the display device 10 includes a cell 13, a top substrate 11, a cell wall 14 and a bottom substrate 12. Cell wall 14, such as, for example, a spacer, forms the space between top substrate 11 and bottom substrate 12. A fluid 15 fills the cell 13. The cell 13 also contains colored particles 16. A substrate 17 may optionally be placed below the viewing substrate 11. The substrate may be an electrode plate, if desired, for the application of an AC field to assist the dispersion of the colored particles in an electrophoretic display device. Both the top substrate 11 and the bottom substrate 12 may be transparent. A viewer can look at the display from the top substrate 11. A pattern of dot field applicators comprised of dot electrodes 18 are placed at the surface of bottom substrate 12. The dot electrodes 18 may be about 50 microns or less in size which make them substantially invisible to naked eyes. As depicted in FIG. 1, when the colored particles 16 are dispersed in the cell 13, the viewer sees cell 13 as having color of colored particles 16. For example, if the colored particles 16 are black, then cell 13 appears black to the viewer.

Figure 2:
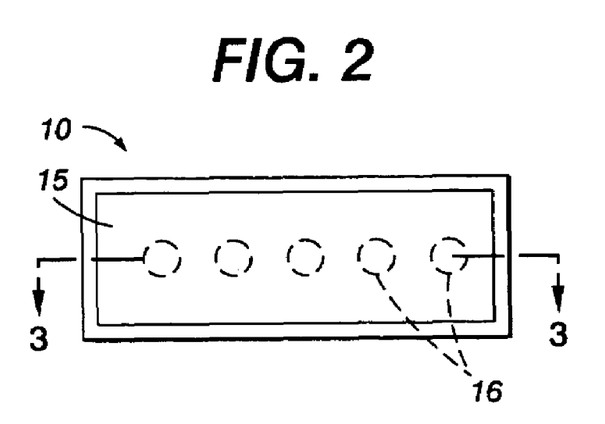
FIG. 2 shows a schematic top view of an embodiment of a display device wherein the colored particles are assembled onto patterned dot electrodes in a cell of the display device such that the color of the colored particles is not visible to a viewer.
Figure 3:
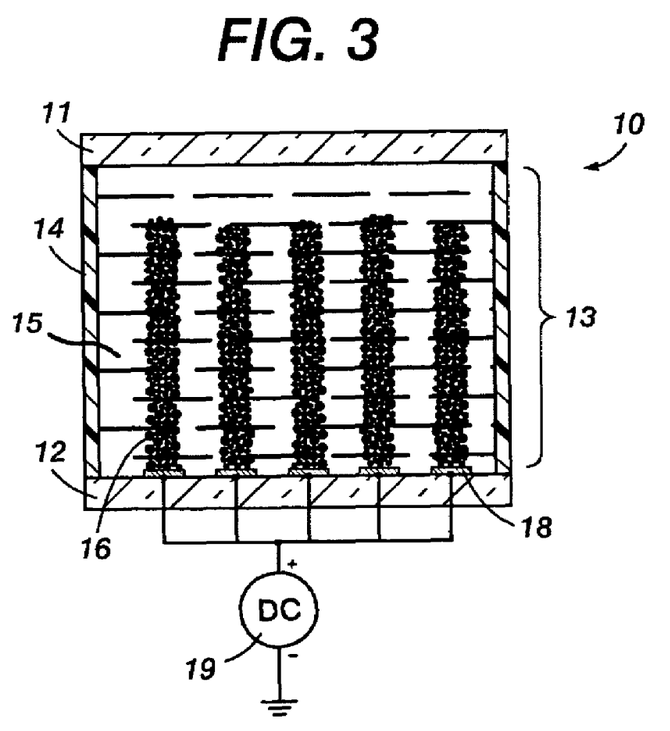
FIG. 3 shows a schematic cross section view of an embodiment of a display device wherein the colored particles are assembled onto patterned dot electrodes in a cell of the display device such that the color of the colored particles is not visible to a viewer.

FIG. 2 and FIG. 3 schematically depict an embodiment of an electrophoretic display device 10. A transparent or colorless state is shown in both figures. A colorless state is a state in which, to naked eyes of a viewer, no substantial color appears to be present at the cell location. As shown in FIG. 3, a sectional view of display device 10, when a DC voltage 19 is applied to dot electrodes 18 with the polarity opposite to the charges carried by colored particles 16, the colored particles 16 stack over one another and move onto the dot electrodes 18. As illustrated in FIG. 2, a top view of display device 10, the cell appears transparent or colorless to the viewer when viewing from the top.

Figure 4:
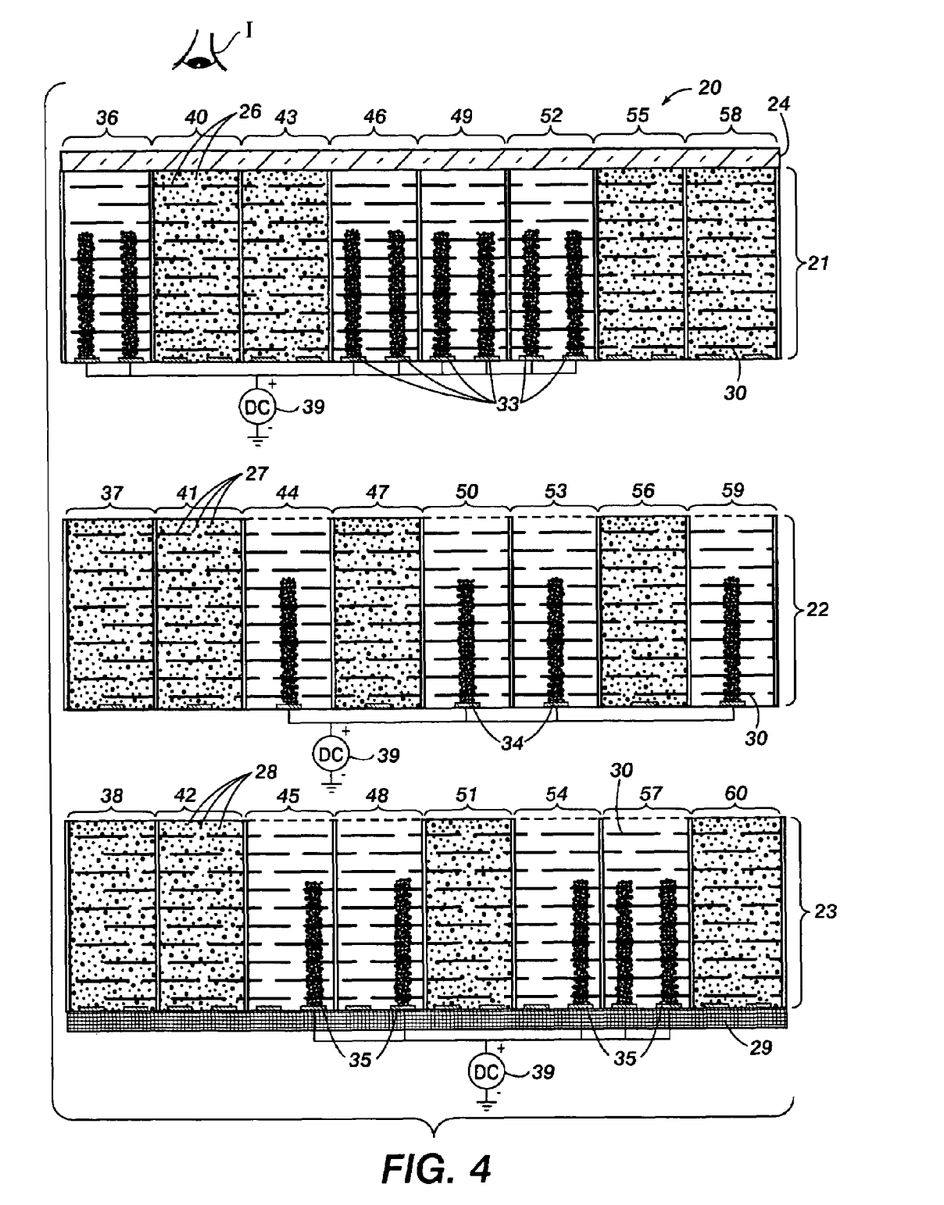
FIG. 4 shows a schematic cross section view of an embodiment of a display device wherein multiple display layers of colored particles are stacked over one another to form a multilayered device capable of displaying multiple colors.

FIG. 4 depicts an embodiment of an electrophoretic display device 20. Specifically, a color display device 20 includes a plurality of display layers 21, 22, and 23, a top substrate 24 and a back substrate 29. Each display layer has an array of cells. Each display layer also has a color that is different from the others. By way of example, display layer 21 may have red colored particles 26 in each cell, display layer 22 may have blue colored particles 27 in each cell and display layer 23 may have yellow colored particles 28 in each cell, and the back substrate 29 may be black. The display device 20 also includes dot electrodes 33, 34 and 35 that are located selectively at each display layer. When a DC voltage 39 is selectively applied to each desired ones of the dot electrodes 33, 34 and 35, the colored particles in the cells associated with such dot electrodes stack over one another at the dot electrodes 33, 34 and 35, respectively. As a result, when the density of red, blue and yellow colored particles in each display layer is low, for example, where the red, blue and yellow colored particles in each display layer comprise from about 5% to about 30%, such as from about 5% to about 25%, of the fluid 30 and colored particles 26, 27 and 28, a viewer may see, by way of example, a) cells 36, 37 and 38 representing a mixture of blue and yellow colored states (the blue colored state of cell 37 of display layer 22 and the yellow colored state of cell 38 of display layer 23 combined, cell 36 of display layer 21 being transparent due to stacking of the red colored particles therein), b) cells 40, 41 and 42 representing a mixture of red, blue and yellow colored states (the red colored state of cell 40 of display layer 21, the blue colored states of cell 41 of display layer 22, and the yellow colored state of cell 42 of display layer 23 combined), c) cells 43, 44 and 45 representing red colored state only (red colored particles being uniformly dispersed in cell 43 of display layer 21 while blue and yellow colored particles are stacked in cell 44 of display layer 22 and cell 45 of display layer 23, respectively), d) cells 46, 47 and 48 representing blue colored state only (blue colored particles being uniformly dispersed in cell 47 of display layer 22 while red and yellow colored particles are stacked in cell 46 of display layer 21 and cell 48 of display layer 23, respectively), e) cells 49, 50 and 51 representing yellow colored state only (yellow colored particles being uniformly dispersed in cell 51 of display layer 23 while red and blue colored particles are stacked in cell 49 of display layers 21 and cell 50 of display layer 22, respectively), f) cells 52, 53 and 54 representing black colored state only (colored particles are stacked in cell 52 of display layer 21, cell 53 of display layer 22 and cell 54 of display layer 23, respectively, leaving only the black colored state of the back substrate 29 visible to the viewer), g) cells 55, 56 and 57 representing a mixture of red and blue colored states (the red colored states of cell 55 of display layer 21 and the blue colored state of cell 56 of display layer 22 combined, with yellow colored particles being stacked in cell 57 of display layer 23), and h) cells 58, 59 and 60 representing a mixture of red and yellow colored states (the red colored states of cell 58 of display layer 21 and the yellow colored state of cell 60 of display layer 23 combined, with blue colored particles being stacked in cell 59 of display layer 22). Thus, as illustrated in the figure, by way of selectively stacking the particles, multiple coloring may be achieved.

The display devices herein may be used for any display application, including, for example, reimageable displays such as paper, watch displays, monitor displays and/or cell phone displays, and the like.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A display device comprising:

at least a first display layer and a second display layer over the first display layer, each display layer comprising one or more cells each containing a fluid and a set of colored particles dispersed in the fluid; and one or more dot field applicators associated with each of the one or more cells in each display layer, wherein for every display layer of the display device the colored particles in a same display layer all exhibit a same color, wherein the colored particles in each different display layer exhibit a different color, wherein the one or more dot field applicators comprise circular dot electrodes, wherein each display layer comprises a multiplicity of cells, and widthwise edges of each of the multiplicity of cells in the second display layer is in vertical alignment with widthwise edges of a corresponding one of the multiplicity of cells in the first display layer, and wherein in corresponding vertically aligned cells of the second display layer and the first display layer, the one or dot field applicators in the aligned cell of the second display layer are offset from the one or more circular dot electrodes in the aligned cell in the first display layer.

2. The display device of claim 1, further comprising a third display layer over the second display layer and a colored back substrate located below all of the display layers.

3. The display device of claim 1, further comprising a third display layer over the second display layer and a fourth display layer over the third display layer.

4. The display device of claim 1, wherein each display layer comprises a plurality of the cells located adjacent each other.

5. The display device of claim 1, wherein the one or more dot field applicators is associated with the cells by being located above or below the cells in each display layer.

6. The display device of claim 1, wherein the circular dot electrodes operate via DC voltage.

7. The display device of claim 1, wherein the fluid in each display layer is transparent.

8. The display device of claim 1, wherein the one or more cells of each display layer has a viewing substrate and a non-viewing substrate spaced apart in opposing relation.

9. The display device of claim 1, wherein the one or more cells of each display layer has a length and width or diameter of from 1 µm to 10 mm.

10. The display device of claim 1, wherein the one or more dot field applicators has a diameter of from 0.1 µm to 50 µm.

11. The display device of claim 1, wherein from 2 to 500 dot field applicators is associated with each of the one or more cells.

12. The display device of claim 1, wherein each of the one or more cells includes a plurality of the dot field applicators situated in a pattern and spaced apart from each other by 0.5 µm to 10 mm.

13. The display device of claim 1, wherein the fluid of each display layer has a viscosity from 0.1 cp to 10 cp at room temperature.

14. The display device of claim 1, wherein the fluid of each display layer comprises tetrafluorodibromoethylene, tetrachloroethylene, trifluorochloroethylene, carbon tetrachloride or mixtures thereof.

15. The display device of claim 1, wherein the colored particles of each display layer comprise pigments, dyed particles, pigment/polymer composites or combinations thereof.

16. The display device of claim 1, wherein the colored particles of each display layer comprise from 5% to 85% by weight of the fluid and colored particles.

17. The display device of claim 1, wherein the colored particles of each display layer have an average diameter of from 0.2 µm to 50 µm.

18. The display device of claim 1, wherein the colored particles of each display layer carry a positive or negative charge.

19. The display device of claim 1, wherein the colored particles and the fluid of each display layer have a substantially matched density.

20. A method for displaying an image in a display device comprising at least a first display layer and a second display layer over the first display layer, each display layer comprising a multiplicity of cells containing a fluid and a set of colored particles dispersed in the fluid, and one or more circular dot electrodes associated with each of the multiplicity of cells in each display layer, wherein widthwise edges of each of the multiplicity of cells in the second display layer is in vertical alignment with widthwise edges of a corresponding one of the multiplicity of cells in the first display layer, wherein in corresponding vertically aligned cells of the second display layer and the first display layer, the one or more circular dot electrodes in the aligned cell of the second display layer is offset from the one or more circular dot electrodes in the aligned cell in the first display layer, and wherein for every display layer of the display device the colored particles in a same display layer all exhibit a same color, and wherein the colored particles in each different display layer exhibit a different color, and a colored back substrate located below all of the display layers, the method comprising:

displaying a color of the second display layer by applying a field to the colored particles of the first display layer via the one or more circular dot electrodes of the multiplicity of cells of the first display layer and not applying a field to the colored particles of the second display layer via the one or more circular dot electrodes of the multiplicity of cells of the second display layer, displaying a color of the first display layer by applying a field to the colored particles of the second display layer via the one or more circular dot electrodes of the multiplicity of cells of the second display layer and not applying a field to the colored particles of the first display layer via the one or more circular dot electrodes of the multiplicity of cells of the first display layer, or displaying a color of the back substrate by applying a field to the colored particles of the first display layer via the one or more circular dot electrodes of the multiplicity of cells of the first display layer and applying a field to the colored particles of the second display layer via the one or more circular dot electrodes of the multiplicity of cells of the second display layer.

21. The method according to claim 20, wherein the display device further comprises a third display layer over the second display layer, and displaying a color of the third display layer by applying a field to the colored particles of the second display layer via the one or more circular dot electrodes of the one or more cells of the second display layer, applying a field to the colored particles of the first display layer via the one or more circular dot electrodes of the one or more cells of the first display layer, and not applying a field to the colored particles of the third display layer via the one or more circular dot electrodes of the one or more cells of the third display layer.

22. The method according to claim 21, wherein a mixture of colors from different display layers is displayed by applying a field via the one or more circular dot electrodes of the one or more cells to no more than one of the first, second and third display layers.

* * * * *